Patented May 10, 1927.

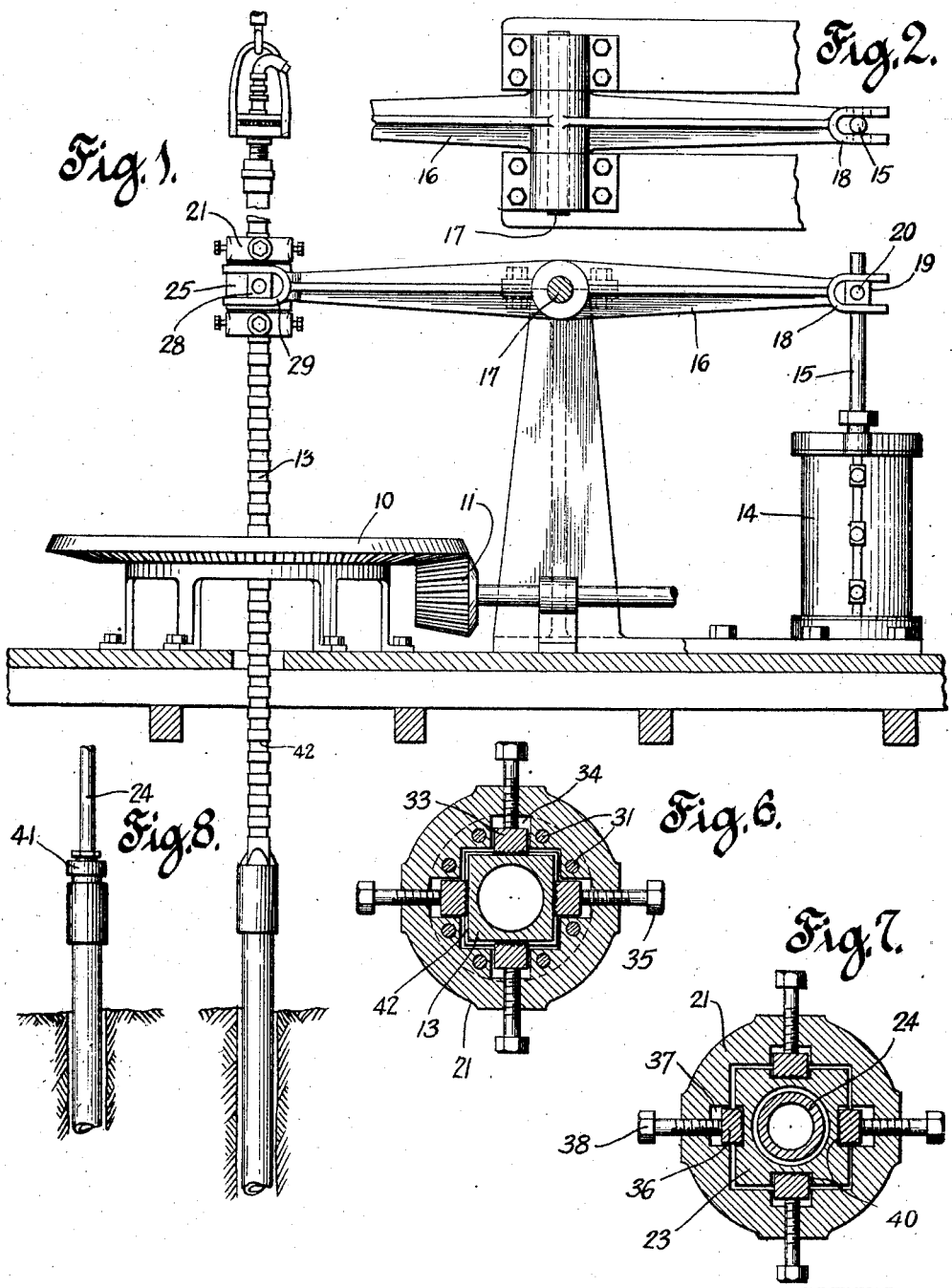

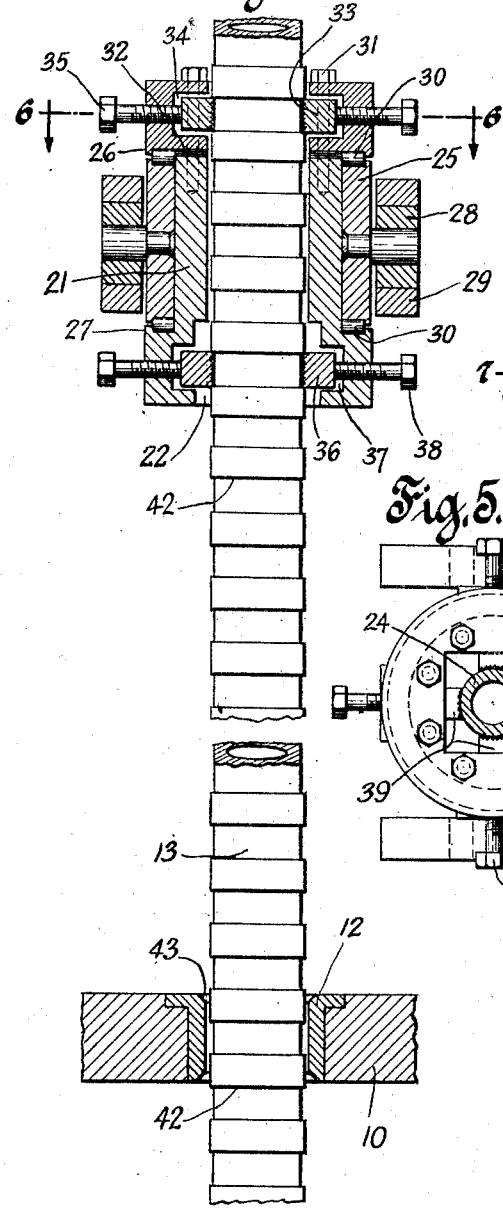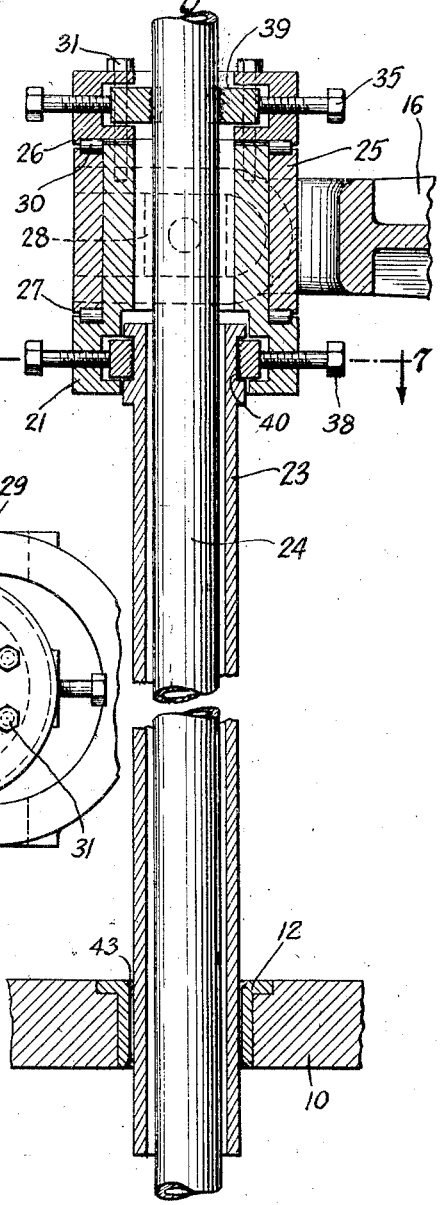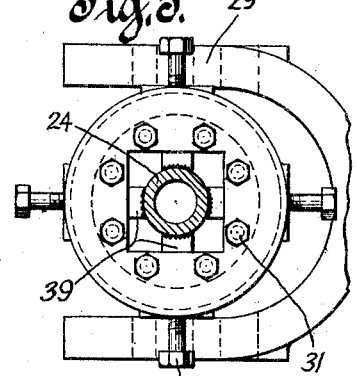

1,628,282

UNITED STATES PATENT OFFICE.

WALDO SHELDON, OF GREENWICH, CONNECTICUT.

WELL-DRILLING APPARATUS.

Application filed May 29, 1923. Serial No. 642,182.

This invention relates particularly to deep oil well drilling apparatus of the type in which the drive is effected by a so-called "rotary table".

The present invention is in the nature of an improvement on the invention disclosed in my co-pending application, Serial #592,265, filed October 4th, 1922, in that the pressure on the rotating drill is controlled by a power device supported in relatively fixed relation at one side of the rotary table and connected with the drill stem by a power transmitting lever or arm extending over the table to a rotary engagement with the drill stem at the center of the table.

Special objects of the invention are to provide a simple, practical and easily handled chuck construction for transmitting the pressure to the drill stem and one which can be used interchangeably either with an angular form of drive rod or with the usual cylindrical form of drill stem.

Other objects and the various novel features of the invention by which the desired results are attained will appear as the specification proceeds.

In the drawing accompanying and forming part of this specification I have illustrated but one simple practical embodiment of my invention, but wish it understood that the structure may be modified in various respects without departure from the broad spirit and scope of the invention, as will be apparent from the scope of the appended claims.

Figure 1 is a side view of the apparatus as in use.

Figure 2 is a broken plan view of the lever connection between the power device and drill stem.

Figure 3 is an enlarged vertical sectional view of the chuck as in use in connection with an angular section of the drill stem.

Figure 4 is a similar view illustrating the method of using the chuck with a circular section of the drill stem.

Figure 5 is a top plan view of the chuck as it appears in use on the circular drill stem.

Figures 6 and 7 are cross sectional views of the chuck as on substantially the planes of lines 6—6 and 7—7 of Figures 3 and 4 respectively.

Figure 8 is a broken detail view illustrating a form of stuffing box used with the cylindrical drill stem.

In Figure 1 I have illustrated parts of a rotary drilling outfit, including the rotary table 10 driven by a pinion 11 and provided at its center with a drive bushing 12 of square or other angular cross section to slidingly receive the angular drive rod 13 of the drill.

The feed of the drill is effected and the desired pressure is applied to the bit by means of the power device located off to one side of the table and shown in the form of a hydraulic cylinder 14, containing a piston provided with a projecting piston rod 15.

In the present illustration the power cylinder is disposed vertically and the pressure applying connection includes a substantially straight lever or arm 16 pivoted intermediate its ends on trunnions 17, said lever having a sliding connection at its outer end with the piston rod and having a sliding and rotatable connection at its inner end with a drill chuck of special construction. As here disclosed, the connection with the piston rod is made by providing the outer end of the lever with forks 18 slidingly receiving the blocks 19 pivoted at 20 on the piston rod.

The chuck consists in the present disclosure of a sleeve-like structure 21 having a bore therethrough of angular outline to fit the drive rod or so-called "grief stem" of the drill and enlarged at the lower end of the chuck to provide an angular seat 22 for the reception of the upper end of a drive quill 23 (Figure 4) which is of angular outline to slidingly fit in a drive bushing in the table and is of large enough internal diameter to pass a cylindrical section 24 of the drill stem.

The rotatable engagement between the lever and chuck is shown as provided by means of a sleeve or collar 25 rotatably engaged about the chuck body between the outstanding thrust shoulders or flanges 26, 27 and carrying at opposite sides, pivoted blocks 28 slidingly fitting in forked portions or guides 29 at the end of the lever. Suitable thrust bearings such as those indicated at 30 are usually provided between the ends of the thrust collar and the adjoining thrust shoulders. In the particular form of construction shown the upper flange is made as a separate piece secured to the body of the chuck by bolts 31 with interposed shims 32 so that wear may be compensated for by the removal of these shims as the load-carrying parts wear down.

The chuck is provided with clamping means shown in the form of a set of angularly related clamp blocks or jaws 33 adjustably guided in seats 34 at the upper end of the chuck and actuated by bolts or screws 35 and a second set of clamp jaws 36 in guides 37 at the lower end of the chuck body, actuated by bolts 38.

When operating with a grief stem or angular drill rod a slidable driving engagement is effected between the rotary table and drill rod by the sliding fit of the angular rod within the correspondingly angular bushing in the table. Under such circumstances the chuck is secured directly upon the angular drive rod, ordinarily both upper and lower sets of clamps being employed, the ends of the jaws being serrated or otherwise suitably shaped to take firm hold upon the rod. When drilling with cylindrical rod, however, the driving engagement between the rotary table and so-called "round" rod is effected by using the hollow drive quill which has a sliding fit in the drive bushing of the table and by setting up the clamps at the upper end of the chuck so as to engage the drill rod, which as shown in Figure 2, then passes down through both the chuck and the hollow drive quill.

Special concave faced jaws may be substituted in the upper end of the chuck when the round rod is to be thus gripped, as indicated at 39, and these jaws may be somewhat longer than the ones ordinarily employed for use on the angular drive rod so as to reach in the greater distance to the smaller rod.

When using the hollow drive quill the same is preferably detachably held in its seat in the lower end of the chuck by setting the jaws at this end of the chuck inward far enough to enter seats 40 provided therefor in the sides of the quill. This forms an interlock between the chuck and quill, making the two for the time being practically integral so that both lifting and lowering force may be applied to the chuck without disconnecting the parts.

With the arrangement of the pressure cylinder as shown, the feed of the drill and the driving force may be accurately governed and the power may also be applied to withdraw the rod or take off the driving pressure. The use of the straight lever connection is of advantage as providing simplicity and great structural strength and as enabling a compact outfit with the parts all accessible and the heavy power mechanism supported low, usually on the derrick floor. The clamps are accessible and easily adjusted so that after a feed stroke of the power device they can be readily released and the chuck be quickly secured in position for a fresh feed stroke. The lever is preferably mounted in bearings which can be quickly opened up, such as indicated, so that it may be readily removed if that becomes desirable during the changes which ordinarily have to be effected during drilling operations.

The importance of the adaptability of the chuck to both the angular and the round drill stem will be appreciated when it is realized that this enables the drill stem to be quickly changed from one form to the other and enables the valves and stuffing boxes and the like to be used in the regular way. In Figure 8 a stuffing box is indicated in use at 41. When the changes are made in the drill stem the chuck is simply disconnected and the change can thus be effected without disconnecting or disarranging other portions of the apparatus and it is particularly important to note that with this invention the heavy power applying portion of the apparatus remains in position off to the side of the rotary table, where it is out of the way of the operations and changes being effected at the table.

To provide a more positive interlock between the chuck and angular drill stem, the latter may be constructed as indicated in Figures 1 and 3, with grooves or cuts 42 in the flat sides of the same, preferably spaced so that both upper and lower clamp jaws can enter such grooves. In order that these drive shoulders shall not interfere with the passage of the angular stem through the drive bushing in the rotary table, the opposite ends of the passage through the bushing may be beveled off, as indicated at 43.

With the transversely shouldered form of grief stem it is possible to use a specially designed chuck having wide jaws to fit in the grooves in the sides of the stem and which jaws can be simultaneously operated with quick opening and closing movements. The actuating fluid for the power cylinder is controlled by suitable valve mechanism which is preferably so designed that as pressure is applied at one end of the cylinder, the pressure will be automatically released at a corresponding rate at the opposite end of the cylinder.

What I claim is:

1. In deep oil well drilling apparatus, the combination with a rotary table having a chuck passage at the center for the drill stem, of a power device supported in fixed relation at one side of the rotary table and a drill controlling and pressure applying lever extending from said power device over the table and having provision for a rotary connection with the drill stem.

2. In deep oil well drilling apparatus, the combination with a rotary table having a chuck passage at the center for the drill stem, of a power device supported in fixed relation at one side of the rotary table, a drill stem holding chuck and a pressure applying and drill controlling lever extending from the power device over the table and having a rotatable pressure applying engagement with the drill stem chuck.

3. The structure of claim 2 in which the chuck is equipped with independently operable gripping means at its opposite ends for holding engagement with cylindrical and angular stems respectively.

4. A chuck for oil well drilling operations comprising a sleeve provided at opposite ends with independently operable drill stem engaging clamps and with thrust shoulders and having a thrust transmitting collar for engagement therewith.

5. In oil well drilling apparatus, a rotary table having a chuck passage for the drill stem, a lever fulcrumed at one side of the table, a drill stem chuck rotatably engaged with said lever and a power device supported in fixed relation at one side of the rotary table and having a pressure applying connection with said lever.

6. A structure as in claim 5 in which the lever is substantially straight with the fulcrum, drill stem chuck and power device connections provided at different points in the length of the same.

7. In oil well drilling apparatus, a chuck having an angular passage therethrough of a size to receive the angular drive stem of a drill and enlarged at its lower end to receive a hollow drive quill of larger external diameter than such angular drill stem, said chuck having clamp means at the lower end thereof for securing said quill and having clamp means at the upper end of the same for holding engagement with a drill stem of a size to extend through the hollow drive quill.

8. In well drilling apparatus, an angular drill stem having transversely extending external shoulders, a chuck having parts to engage said shoulders on the angular stem and a rotary table having an angular chuck passage therethrough for said angular drill stem and beveled at its opposite ends to enable the shouldered portions of the drill stem to slide freely through such passage.

9. A hollow drill rod of externally angular outline provided with seats in the angular sides of the same.

10. In well drilling apparatus, a rotary table having an angular chuck passage, a tubular element of angular cross section slidingly engaged in said chuck passage and provided with seats in the angularly related sides of the same and a chuck engaged about said tubular element and provided with jaws for entering said seats.

11. In deep oil well drilling apparatus, the combination with a rotary table having a chuck passage at the center for the drill stem, of a power cylinder supported in fixed relation at one side of the rotary table and a drill controlling pressure applying lever extending from said power cylinder across the table and having provision for a rotary connection with the drill stem.

12. In well drilling apparatus, a chuck sleeve having a passage therethrough to receive the drive stem of the drill, said chuck sleeve having independently operable clamp means at both the upper and lower ends of the same for holding engagement with a drill stem or chuck sleeve of different diameter, external thrust shoulders on said chuck sleeve intermediate the upper and lower clamp means and a thrust transmitting collar in relatively rotatable engagement with said thrust shoulders and having means for enabling the application thereto of lifting or lowering forces.

13. In well drilling apparatus, a drill stem having longitudinal shoulders for rotary drive and transverse shoulders for vertical drive, chuck means having vertical shoulders for sliding engagement with the longitudinal drive shoulders of the drill stem and adjustable horizontal shoulders for engagement with the transverse shoulders of the drill stem, a rotary table having a central passage for the drill stem and a detachable mounting for said chuck means.

14. A chuck for oil well drilling operations comprising a sleeve provided with adjustable clamping means for gripping a drill stem extending through the sleeve, said sleeve having external thrust shoulders, a thrust transmitting collar surrounding said sleeve having means for enabling engagement of power connections therewith and friction reducing bearings between the collar and said thrust shoulders.

15. A chuck for oil well drilling operations comprising a sleeve provided with adjustable clamping means for gripping a drill stem extending through the sleeve, said sleeve having external thrust shoulders, a thrust transmitting collar surrounding said sleeve having means for enabling engagement of power connections therewith and friction reducing bearings between the collar and said thrust shoulders, the chuck sleeve having an adjustably fixed removable head enabling endwise removability of the thrust transmitting collar therefrom.

In witness whereof, I have hereunto set my hand this 18th day of May, 1923.

WALDO SHELDON.